US008815144B2

(12) United States Patent
Harmon et al.

(10) Patent No.: US 8,815,144 B2
(45) Date of Patent: *Aug. 26, 2014

(54) CARBON NANOTUBE/POLYMER COMPOSITES RESISTANT TO IONIZING RADIATION

(75) Inventors: Julie P. Harmon, Tampa, FL (US); Patricia Anne O. Muisener, Clearwater, FL (US); LaNetra M. Clayton, Plant City, FL (US); John D'Angelo, St. Petersburg, FL (US)

(73) Assignee: University of South Florida, Tampa, FL (US)

( * ) Notice: Subject to any disclaimer, the term of this patent is extended or adjusted under 35 U.S.C. 154(b) by 629 days.

This patent is subject to a terminal disclaimer.

(21) Appl. No.: 12/716,659

(22) Filed: Mar. 3, 2010

(65) Prior Publication Data

US 2010/0155220 A1 Jun. 24, 2010

Related U.S. Application Data

(63) Continuation of application No. 10/305,532, filed on Nov. 27, 2002, now abandoned, and a continuation-in-part of application No. 11/026,962, filed on Dec. 30, 2004, now abandoned.

(60) Provisional application No. 60/334,158, filed on Nov. 29, 2001.

(51) Int. Cl.
*H05B 6/00* (2006.01)

(52) U.S. Cl.
USPC .......................................... 264/488; 264/405

(58) Field of Classification Search
USPC .............................................. 264/405, 488
See application file for complete search history.

(56) References Cited

U.S. PATENT DOCUMENTS

| 4,826,889 | A | * | 5/1989 | Ellis et al. ........................ 522/99 |
| 5,406,117 | A | * | 4/1995 | Dlugokecki et al. ........... 257/659 |
| 5,640,705 | A | * | 6/1997 | Koruga ............................ 588/16 |
| 6,057,637 | A | | 5/2000 | Zettl et al. |
| 6,265,466 | B1 | * | 7/2001 | Glatkowski et al. ........... 523/137 |
| 6,599,961 | B1 | | 7/2003 | Pienkowski et al. |
| 2002/0001620 | A1 | * | 1/2002 | Pienkowski et al. ........... 424/486 |

FOREIGN PATENT DOCUMENTS

JP 2001011344 1/2001

OTHER PUBLICATIONS

X-ray: http://en.wikipedia.org/wiki/X-rays Jun. 12, 2013.*
Banhart, F. "The Formation of a Connection Between Carbon Nanotubes in an Electron Beam" *Nano Letters*, Jun. 13, 2001, pp. 329-332, vol. 1, No. 6.
Bower, C. et al. "Deformation of Carbon Nanotubes in Nanotube-Polymer Composites" *Applied Physics Letters*, May 31, 1999, pp. 3317-3319, vol. 74, No. 22.

(Continued)

*Primary Examiner* — Timothy Kennedy
*Assistant Examiner* — David N Brown, II
(74) *Attorney, Agent, or Firm* — Saliwanchik, Lloyd & Eisenschenk

(57) ABSTRACT

Polymer composites directed to single wall carbon nanotubes (SWNT) dispersed within poly(methyl methacrylate) (PMMA) and their methods of synthesis. Composites of the present invention are also formulated as films and spun coat onto desired substrates. Advantageously, both the composites and films of the present invention exhibit resistance to radiation.

18 Claims, 6 Drawing Sheets

(56) References Cited

OTHER PUBLICATIONS

Emran, S. K. et al. "Viscoelastic Properties and Phase Behavior of 12-*tert*-Butyl Ester Dendrimer/Poly(methyl methacrylate) Blends" *Journal of Polymer Science: Part B Polymer Physics*, 2001, pp. 1381-1393, vol. 39.

Gao, H. et al. "Para-Substituted Polystyrenes: Stress Relaxation, Creep, Dynamic Mechanical and Dielectric Analyses" *Thermochimica Acta*, 1996, pp. 85-102, vol. 284.

Grimes, C. A. et al. "The 500 MHz to 5.50 GHz Complex Permittivity Spectra of Single-Wall Carbon Nanotube-Loaded Polymer Composites" *Chemical Physics Letters*, Mar. 24, 2000, pp. 460-464, vol. 319.

Hamon, M. A. et al. "Dissolution of Single-Walled Carbon Nanotubes" *Advanced Materials*, 1999, pp. 834-840, vol. 11, No. 10.

Higgenbotham-Bertolucci, P. R. et al. "Creep and Stress Relaxation in Methacrylate Polymers: Two Mechanisms of Relaxation Behavior Across the Glass Transition Region" *Polymer Engineering and Science*, May 2001, pp. 873-880, vol. 41, No. 5.

Hwang, G. L. et al. "Breakage, Fusion, and Healing of Carbon Nanotubes" *Nano Letters*, Jul. 18, 2001, pp. 435-438, vol. 1, No. 8.

Jia, Z. et al. "Study on Poly(methyl methacrylate)/Carbon Nanotube Composites" *Materials Science & Engineering*, 1999, pp. 395-400, vol. A271.

Jin, L. et al. "Alignment of Carbon Nanotubes in a Polymer Matrix by Mechanical Stretching" *Applied Physics Letters*, Aug. 31, 1998, pp. 1197-1199, vol. 73, No. 9.

Jin, Z. et al. "Nonlinear Optical Properties of Some Polymer/Multi-walled Carbon Nanotube Composites" *Chemical Physics Letters*, Mar. 3, 2000, pp. 505-510, vol. 318.

Kiang, C. H. et al. "Structural Modification of Single-Layer Carbon Nanotubes with an Electron Beam" *J. Phys. Chem.*, 1996, pp. 3749-3752, vol. 100.

Koshio, A. et al. "A Simple Way to Chemically React Single-Wall Carbon Nanotubes with Organic Materials Using Ultrasonication" *Nano Letters*, 2001, pp. 361-363, vol. 1, No. 7.

Krasheninnikov, A. V. et al. "Formation of Ion-Irradiation-Induced Atomic-Scale Defects on Walls of Carbon Nanotubes" *Physical Review B*, 2001, pp. 245405-1 to 245405-6, vol. 63.

Lourie, O. et al. "Transmission Electron Microscopy Observations of Fracture of Single-Wall Carbon Nanotubes Under Axial Tension" *Applied Physics Letters*, Dec. 14, 1998, pp. 3527-3529, vol. 73, No. 24.

McCarthy, B. et al. "Observation of Site Selective Binding in a Polymer Nanotube Composite" *Journal of Materials Science Letters*, 2000, pp. 2239-2241, vol. 19.

Niyogi, S. et al. "Chromatographic Purification of Soluble Single-Walled Carbon Nanotubes (s-SWNTs)" *J. Am. Chem. Soc.*, Jan. 9, 2001, pp. 733-734, vol. 123.

Qian, D. et al. "Load Transfer and Deformation Mechanisms in Carbon Nanotube-Polystyrene Composites" *Applied Physics Letters*, May 15, 2000, pp. 2868-2870, vol. 76, No. 20.

Satishkumar, B. C. et al. "Novel Experiments with Carbon Nanotubes: Opening, Filling, Closing and Functionalizing Nanotubes" *J. Phys. B: AT Mol. Opt. Phys.*, 1996, pp. 4925-4934, vol. 29.

Schadler, L. S. et al. "Load Transfer in Carbon Nanotube Epoxy Composites" *Applied Physics Letters*, Dec. 28, 1998, pp. 3842-3844, vol. 73, No. 26.

Star, A. et al. "Starched Carbon Nanotubes" *Angew. Chem. Int. Ed.*, 2002, pp. 2508-2512, vol. 41, No. 14.

Sun, Y. et al. "High Dissolution and Strong Light Emission of Carbon Nanotubes in Aromatic Amine Solvents" *J. Am. Chem.*, May 11, 2001, pp. 5348-5349, vol. 123.

Beuneu, F. et al. "Modification of Multiwall Carbon Nanotubes by Election Irradiation: An ESR Study", *Physical Review B*, Feb. 15, 1999, pp. 5945-5948, vol. 59, No. 8.

Chopra, N. et al. "Collapsing Carbon Nanotubes With an Electron Beam", *Chemical Physics Letters*, Jun. 28, 1996, pp. 241-245, vol. 256.

De Jonge, N et al. "High Brightness Electron Beam from a Multi-walled Carbon Nanotube", *Nature*, Nov. 28, 2002, pp. 393-395, vol. 420, No. 6914.

Kirsanov, V. et al. "Nature of Radiation-stimulated Phase Transformations of Graphite Nanotubules to Fullerenes and Onions", *Pergamon*, 1998, pp. 305-306, vol. 51, No. 2.

Salvetat, J. et al. "Elastic and Shear Moduli of Single-Walled Carbon Nanotube Ropes", *Physical Review Letters*, Feb. 1, 1999, pp. 944-947, vol. 82, No. 5.

Smith, B. et al. "Knock-on Damage in Single Wall Carbon Nanotubes by Electron Irradiation", *Electronic Properties of Novel Materials-Science and Technology of Molecular Nanostructures*, 1999, pp. 360-363.

Moore, V. C. et al. "Individually Suspended Single-Walled Carbon Nanotubes in Various Surfactants", *Nano Letters*, 2003, pp. 1379-1382, vol. 3, No. 10.

* cited by examiner

CARBON NANOTUBE/POLYMER COMPOSITES RESISTANT TO IONIZING RADIATION

CROSS-REFERENCE TO RELATED APPLICATIONS

This application is a continuation of U.S. application Ser. No. 10/305,532, filed Nov. 27, 2002 now abandoned and Ser. No. 11/026,962, filed Dec. 30, 2004, now abandoned which claims the benefit of U.S. Provisional Application Ser. No. 60/334,158, filed Nov. 29, 2001, which are hereby incorporated in their entirety by reference.

FIELD OF INVENTION

The subject invention pertains to the field of polymer composites, more particularly to the use of carbon nanotubes therein.

BACKGROUND OF THE INVENTION

Since the discovery of carbon nanotubes in 1991, interest has focused on exploiting their novel electronic and mechanical properties on a macroscopic scale in polymer composites (Iijima, S., *Nature* (1991)). For example, nonlinear optical (NLO) properties of nanotube composites have applications in optical sensor technology (Jin, Z. et al., *Chem. Phys. Lettrs.* (2000)). Nanotubes are also of great interest in electromagnetic (EMI) shielding applications and in the design and development of nanoscale electronic devices (see Grimes, C. A. et al., *Chem. Phys. Lettrs.* (2000); and Star, A. et al., *Agnew. Chem. Int. Ed.* (2001)). Their high aspect ratio, mechanical strength and high modulus have prompted scientists to design and characterize novel composites of carbon nanotubes embedded in a series of host polymers (see Shadier, L. S. et al., *Apply. Phys. Lettrs.* (1998); Qian, D. et al., *Apply. Phys. Lettrs.* (2000); Bower, C. et al., *Apply. Phys. Lettrs.* (1999); Jin, L. et al., *Apply. Phys. Lettrs.* (1998); and Lourie, O. and H. D. Wagner, *Apply. Phys. Lettrs.* (1998)). Such ultra-strong, low-density, carbon nanotube composites demonstrate extraordinary potential for structural design in the building and automotive industry.

The chemical modification of nanotubes further broadens their uses in polymeric composites. Experimental results indicate that certain free-radical initiators open TC bonds in carbon nanotubes. Indeed, when present during the addition polymerization of methyl methacrylate to create polymethylmethacrylate (PMMA), carbon nanotubes have been shown to participate in the polymerization process (Jia, Z. et al., *Mater. Sci. and Eng.* (1999)). Several studies show that electron and ion beam irradiation of nanotubes gives rise to amorphization and dimensional changes. In some instances, irradiation appears to be responsible for "soldering" nanotubes to form mechanical junctions (see Banhart, F., *Nano Lettrs.* (2001); Krasheninnikov, A. V. et al., *Phys. Rev.* (2001); Kiang, K. H. et al., *J. Phys. Chem.* (1996); McCarthy, B. et al., *J. Mater. Sci. Letter.* (2000); and Hwang, G. L. and K. C. Hwang, *Nano Lett.* (2001)). Untrasonification has been used to induce the sonochemical reactions of single wall carbon nanotubes (SWNTs) and organic materials (Koshio, A. et al., *Nano Lettrs.* (2001)). Further intensive investigations document the functionalizing of nanotubes to render them soluble in various polymeric and liquid media (see Niyogi, S. et al., *J. Amer. Chem. Soc.* (2001); Hamon, M. A. et al., *Adv. Mater.* (1999); Sun, Y. et al., *J. Amer. Chem. Soc.* (2001); and Satishkumar, B. C. et al., *J. Phys. B. At. Mol. Opt. Phys.* (1996)).

These previous studies prompted an investigation of the effects of gamma radiation on PMMA/SWNT nanocomposites. This study subjected irradiated samples of PMMA/SWNT composites to thermal and mechanical testing. Scanning electron microscopy (SEM) was employed in order to document radiation-induced effects on the nanocomposite structure.

All references cited herein are incorporated by reference in their entirety, to the extent not inconsistent with the explicit teachings set forth herein.

BRIEF SUMMARY OF THE INVENTION

This invention relates to polymer nanotube composites and describes radiation induced chemistry at the interface of the host polymer and the nanotube structures. In one aspect, the present invention provides single wall carbon nanotube and poly(methyl methacrylate) composites that demonstrate radiation resistance. Further, the present invention provides a method for preparing such composites.

The discoveries and teachings set forth herein impart insight into the nature of radiation-induced events in nanotubes and nanocomposites. As it will be apparent to those skilled in the art, these radiation resistant polymers can be advantageously used in the manufacture of biomedical devices, scintillators, and structures used in space environments. These items, previously constructed from inferior and undesirable materials, can be prone to many types of radiation exposure. Accordingly, it is an object of the present invention to provide an improved polymer composite resistant to ionizing radiation.

It is a further object of the present invention to provide methods for improving polymer resistance to ionizing radiation.

It is a still further object of the present invention to provide a polymer composite containing carbon nanotubes that are resistant to ionizing radiation.

Further objects and advantages of the present invention will become apparent by reference to the following detailed disclosure of the invention and appended drawings.

DETAILED DISCLOSURE OF THE INVENTION

Figure 1:
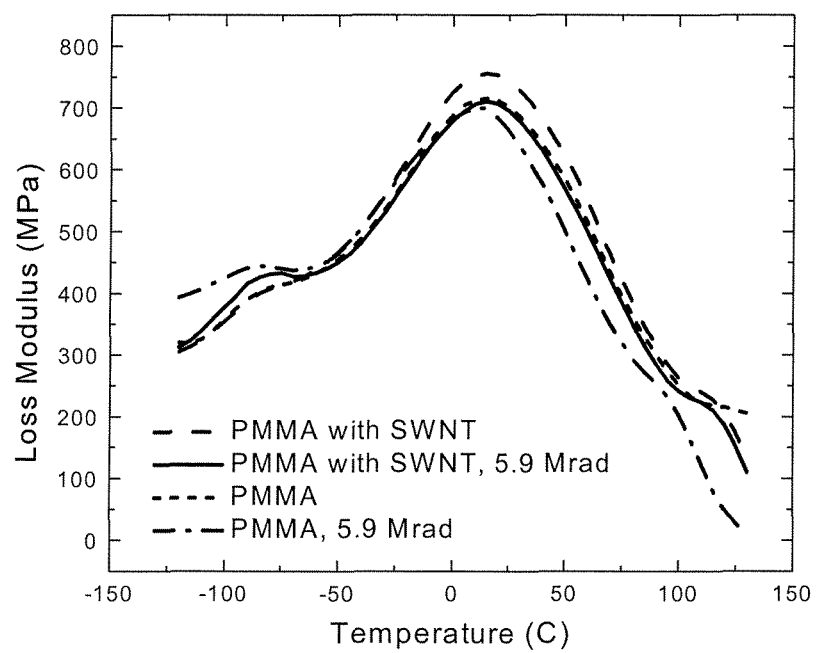
FIG. 1 is a graphical depiction of the Loss Modulus versus Temperature at 10 Hz for the neat PMMA and composite samples before and after irradiation.

Following are examples which illustrate procedures for practicing the invention. To test the radiation resistance characteristics of the carbon nanotube/polymer composite according to the present invention, PMMA/SWNT composites were fabricated and exposed to ionizing radiation with a $Co^{60}$ source at a dose rate of $1.28 \times 10^6$ rad/hour in an air environment for a total dose of 5.9 Mrads. Neat nanotube paper (PMMA/SWNT composite) and pure PMMA were also exposed. Spun coat films of PMMA/SWNT were exposed to ionizing radiation with $Ce^{157}$ at a dose rate of $4.46 \times 10^3$ rad/hr for a total dose of 3.86 Mrads. Both irradiated and non-irradiated samples were compared. Glass transition temperatures were characterized by differential scanning calorimetry. Dynamic mechanical analysis and dielectric analysis evidenced changes in relaxations induced by irradiation. Irradiated composites exhibited radiation induced chemistry distinct from degradation effects noted in the pure polymer. Microhardness measurements were performed using a LEICA VMHT microhardness tester (W. Nuhsbaum, Inc., McHenry, Ill.) with a VICKERS indenter (Micro Photonics, Inc., Allentown, Pa.). For each indentation made, the load was 500 g and the dwell time was 20 seconds. Scanning electron microscopy provided images of the SWNTs and PMMA/SWNT interface before and after irradiation.

The examples provided herein should not be construed as limiting. All percentages are by weight and all solvent mixture proportions are by volume unless otherwise noted.

Example 1

Polymethylmethacrylate is synthesized via addition polymerization. The viscosity average molecular weight ($M_v$) is obtained via dilute solution viscometry following previously established procedures (Collins, E. et al., *Experiments in Polymer Chemistry* (1973)). My was determined to be 234K using the Mark Houwink parameters, $K=3.4 \times 10^3$ and $a=0.83$.

PMMA/SWNT Composite Synthesis

The following is a general procedure for preparing a composite containing 0.26 wt % SWNT in PMMA. The single wall carbon nanotubes are dispersed in dimethyl formamide DMF for two hours using a Branson Sonifier 450. The PMMA is then added to the solution. This heterogeneous mixture is then sonicated for an additional two hours. The PMMA/SWNT mixture is then precipitated out of the solution with methanol. The PMMA/SWNT composite is then dried in an oven at 110° C. for two days. To ensure that the composite is thoroughly mixed, the product is folded and fractured. The pieces are stacked between two polished metal plates and hot pressed at 275° F. and 3000 lbs of pressure for thirty minutes. This melt mixing procedure is repeated five times to produce a uniform composite. Pure PMMA is also dissolved in DMF and films are prepared in the above manner in an effort to provide uniform comparison. Samples are compression molded at 275° F. in a Carver Press.

To prepare spun coat films containing 1 wt % SWNT in PMMA, the SWNT are first dispersed in DMF using a sonicator. The PMMA is then added to the solution and sonicated further. The resulting 4 wt % solution is spun coat onto silicon wafers using a Chemat Tech Spin-Coater KW 4-A at 1,000 rpm for sixty seconds.

Thermal and Mechanical Testing and Image Analysis of PMMA/SWNT Composite

The molded samples of pure PMMA (control) and neat nanatube paper (PMMA/SWNT composite) are exposed to 5.9 Mrad doses of radiation by a cobalt 60 ($Co^{60}$) source at a dose rate of $1.28 \times 10^6$ rad/hour in an air environment. Spun coat films of PMMA/SWNT are exposed to ionizing radiation with a cesium 157 ($Ce^{157}$) source at a dose rate of $4.46 \times 10^3$ rad/hr for a total dose of 3.86 Mrads.

Glass transition temperatures are determined on a TA Instruments 2920 Differential Scanning Calorimeter (DSC). Samples, weighing more than 5 mg and less than 10 mg, are heated using the heat/cool/heat method at a rate of 5° C./min over a temperature range of 20° C. to 200° C. under a nitrogen purge. To erase annealing effects, glass transition temperatures are taken from the inflection inflection of the second heat curve.

Dynamic Mechanical data is obtained using a TA Instruments 2980 Dynamic Mechanical Analyzer (DMA) at a rate of 4° C./min over a temperature range of −125° C. to 150° C. using TA Instrument's gas cooling accessory (GCA). Thin film tension mode is used with an amplitude of 5 microns and a frequency range of 1 to 100 Hz.

Dielectric measurements are conducted on a TA Instruments Dielectric Analyzer (DEA) 2970. Under a nitrogen purge of 500 mL/min, ceramic parallel-plate sensors screen printed with gold are used to measure dielectric properties. A 1.2 mm thick and 25 mm diameter sample is subjected to an applied voltage producing a permitivity and loss factor as a function of temperature and frequency. A frequency sweep over a range of 0.1 to 300,000 Hz from −85° C. to 200° C. is conducted at a heating rate of 2° C./min. For each sample the ram applies a maximum force of 250 N for a minimum spacing of 1.0 mm.

Images of the single walled nanotube paper are taken before and after irradiation with a Hitachi S-800 Field Emission Scanning Electron Microscope. Micrographs are also used to study the effects of gamma radiation on spun coat films of 1% SWNT in PMMA.

Microhardness measurements were performed using a LEICA VHMT MOT microhardness tester (W. Nuhsbaum, Inc., McHenry, Ill.), equipped with a VICKERS indenter (Micro Photonics, Inc., Allentown, Pa.). For each indentation made, the load was 500 g and the dwell time was 20 seconds. The VICKERS hardness number is based on the average diagonal length of the imprint made from the indenter. Four indentations were made for each sample, and both diagonals were measures for each indentation. The VICKERS hardness number reported an average of the eight measurements.

Table 1 lists the glass transition temperatures $T_g$ for samples before and after exposure to 5.9 Mrads. The glass transition temperature of the neat PMMA sample prior to irradiation is 98° C. as compared to 112° C. for the composite. A concentration of 0.26% by weight of nanotubes results in a significant increase in $T_g$. After irradiation, the glass transition temperature of the neat PMMA decreases by 4° C., while that of the composite remains constant. PMMA is known to undergo radiation induced scission reactions (Garrett, R. G. et al., *Radiation Effects in Polymers* (1991)). Low Low molecular weight fragments produced by the scission reactions decrease the glass transition temperature of the polymer matrix. It is significant to note that this effect is not noted in the composite.

There are three scenarios to describe the fact that the PMMA/SWNT does not exhibit a decrease in $T_g$ after gamma radiation. The first scenario is the nanotube network decreases sensitivity to motion associated with lower molecular weight polymer. The second scenario is the nanotubes undergo radiation induced reactions causing them to bind together or to bind to the PMMA. This tighter network resists flow. Finally the third scenario is the π system in the nanotube network acts as a radiation sink and impedes degradation. Previous studies have shown that conjugated phenyl-ring systems are known to act as radiation sinks (Guillot, J., *Polymer Photophysics and Photochemistry* (1985)). Radiation induced excitation in the systems localizes radiation energy, impeding it from migration to more sensitive parts of the system which are prone to degradation. In one study, six different aromatic ring structures were shown to reduce the chain scission yield in PMMA (Clough, R. L. et al., *Irradiation Effects on Polymers* (1991)).

TABLE 1

Glass Transition Temperatures found from DSC.

| Sample | Glass Transition Temperature (° C.) |
|---|---|
| PMMA | 98 |
| PMMA irradiated 5.9 Mrad | 94 |
| PMMA with 0.26% SWNT | 112 |
| PMMA with 0.26% SWNT Irradiated 5.9 Mrad | 112 |

Dynamic Mechanical Analysis is used to determine a materials elastic component, storage modulus, and a materials viscous component, loss modulus. DMA results on the samples essentially reconfirmed the results found via DSC. The storage modulus, E', of both the PMMA and the PMMA/SWNT composites before and after irradiation is shown in Table 2 at 10 Hz for four different temperatures.

TABLE 2

Storage Modulus (MPa) at 10 Hz for the neat PMMA and composite samples before and after irradiation at four different temperatures.

| Samples | Temperatures | | | |
|---|---|---|---|---|
| | −52° C. | 0° C. | 23° C. | 75° C. |
| PMMA | 10826 | 7730 | 5836 | 3098 |
| PMMA, 5.9 Mrad | 10144 | 6799 | 4935 | 2094 |
| PMMA with SWNT | 11503 | 8184 | 6131 | 3154 |
| PMMA with SWNT, 5.9 Mrad | 11128 | 7841 | 5967 | 2986 |

E' for PMMA decreases significantly after exposure to gamma radiation. This is in keeping with the fact that scission reactions reduce the number of load bearing chains per unit volume of material; E' is proportional to the density and, hence, to the number of load bearing chains per unit volume (see Gao, H. and J. P. Harmon, *Thermochimicia Acta* (1996); Rao, R., *J. Chem. Phys.* (1941); and Van Krevel an, D. W. and P. J. Hoftyzer, *Properties of Polymers* (1970)). The storage modulus increases when SWNTs are added to the PMMA matrix. When the PMMA/SWNT composite is exposed to gamma radiation the storage modulus decreases slightly. After exposure to gamma radiation the storage modulus of PMMA at room temperature decreases by 15% whereas the storage modulus for the composite decreases by only 3%. The slight decrease in storage modulus is further evidence that the SWNTs produce a more radiation resistant composite.

Referring now to FIG. 1, the loss modulus versus temperature at 10 Hz is shown. Three transitions are evident: an α transition associated with large scale segmental motion, a secondary β transition associated with hinder motion of the ester groups about the carbon-carbon bond which links the side group to the main chain; and a γ transition associated with local molecular motion of the methyl group in the side chain (Bertolucci, P. R. H. and J. P. Harmon, *Photonic and Optoelectronic Polymers* (1997). The α transition is obscured by sample flow at high temperatures. The α and β transitions merge in PMMA due to the well documented cooperative motion between the α and β events. The extent of merging increases with the oscillation frequency (see Bertolucci, P. R. H. et al., *Polymer Engineering and Science* (2001); Emran, S. K. et al., *Journal of Polymer of Science* (2001); and Calves, M. S. and J. P. Harmon, *Optical Polymers Fibers and Waveguides* (1999)).

Table 3 lists the activation energies and the width at half-height for the beta transition. Gamma radiation induced an increase in activation energy and a decrease in the width at half-height in both the neat polymer and the composite. The activation energies were higher and the width at half-height was narrower for the neat polymers as compared to the composites. The narrower half widths indicate a decrease in the relaxation time spectra for the neat polymer. The nanotubes perturb the uniform polymer matrix and give rise to an increase in the relaxation time spectra. Again, the proximity between the α and β transitions indicates that the beta transition data is probably influenced by cooperative motion associated with the glass transition. It is also interesting to note, that the γ relaxation is more pronounced in irradiated samples; the reason for this phenomenon is not apparent.

TABLE 3

Activation Energies and E' loss peak half-height width at 10 Hz from the Beta Transition

| | $\Delta E_a$ (kcal/mol) | $\Delta T_{1/2}$ (° C.) |
|---|---|---|
| PMMA | 20 | 92 |
| PMMA, 5.9 Mrad | 24 | 77 |
| PMMA with SWNT | 19 | 98 |
| PMMA with SWNT, 5.9 Mrad | 20 | 94 |

Figure 2:
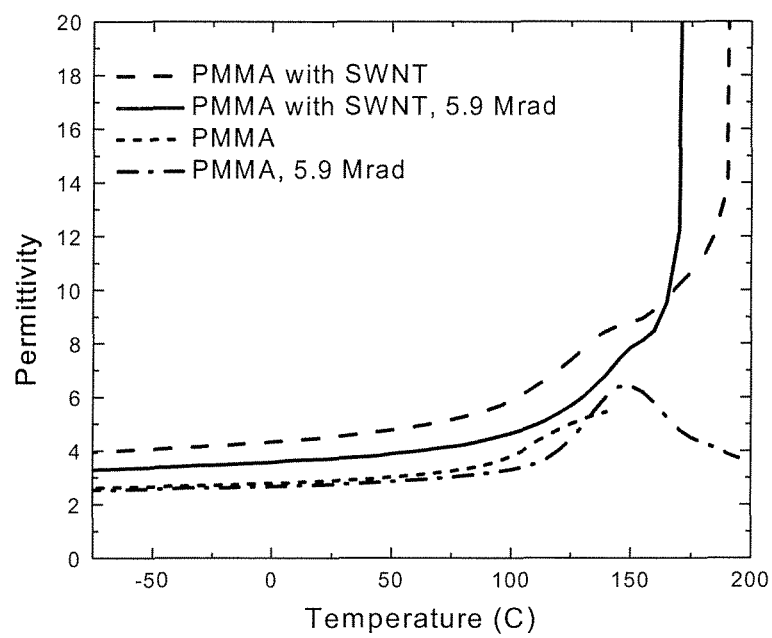
FIG. 2 is a graphical depiction of the Permitivity versus Temperature at 10,000 Hz for the neat PMMA and composite samples before and after irradiation.

Dielectric Analysis measures both permittivity ($\in'$) and loss factor ($\in''$) as a function of temperature. Both the permitivity and loss-factor are controlled by dielectric polarization which is a measure of the density of the number of dipole moments per unit volume. One third of carbon nanotubes are metallic and the remaining two thirds are conducting (Grimes, C. A. et al., *Chem. Phys. Lettrs.* (2000)). The semiconducting nanotubes in the composite increase the permittivity of the polymer binder. Referring now to FIG. 2, the $\in'$ versus temperature at 10,000 Hz is shown. The PMMA/SWNT composite exhibits the highest permitivity. Radiation decreases the permitivity in the composite more so than the neat polymer. Densification of the matrix or reactions between the nanotubes and matrix are responsible for the decrease in effectiveness of dipole alignment in irradiated samples.

Figure 3:
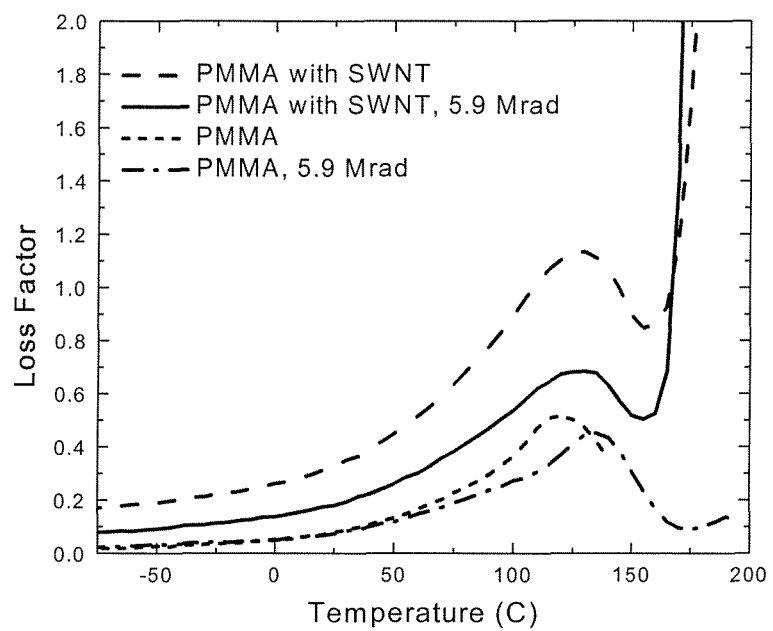
FIG. 3 is a graphical depiction of the Loss Factor versus Temperature at 10,000 Hz for the neat PMMA and composite samples before and after irradiation.

The imaginary permitivity or loss factor, shown in FIG. 3, exhibits the same trend. High temperature effects are obscured by conductivity at lower temperatures and higher frequencies.

Figure 4:
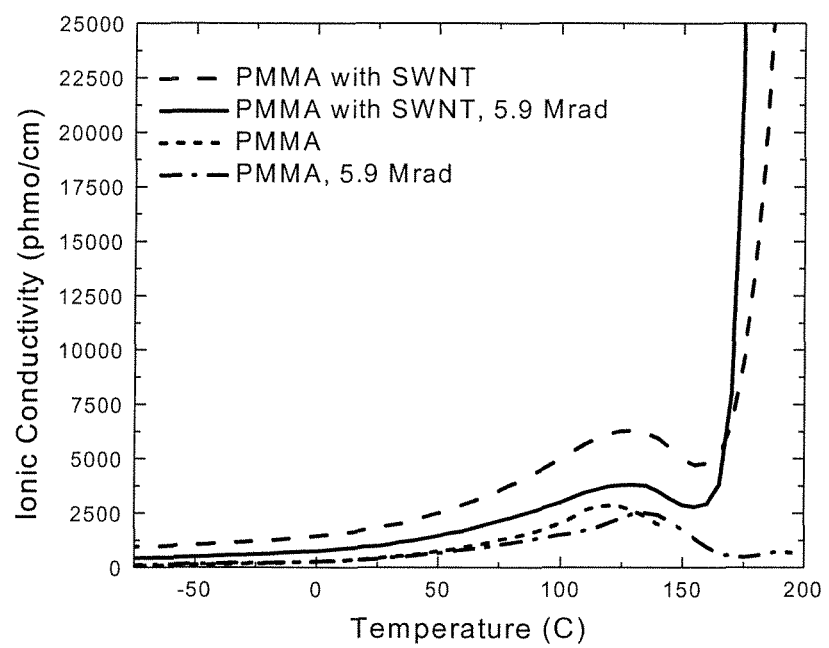
FIG. 4 is a graphical depiction of the Ionic Conductivity versus Temperature at 10,000 Hz for the neat PMMA and composite samples before and after irradiation.

The ionic conductivity, σ, is calculated using the following equation (see Emran, S. K. et al., *Journal of Polymer Science* (1999))

$$\sigma = \in'' \omega \in_0 \quad (1)$$

where ω is the angular frequency (2πf) and $\in_0$ is the absolute permitivity of free space ($8.5 \times 10^{-12}$ F/m). FIG. 4 shows the ionic conductivities. Ionic conductivities again follow the same trend as the imaginary and real permitivities indicating a contribution from metallic or conducting fraction of nanotubes. These results indicate that these dielectric heterostructures have useful application in the electronics industry.

Figure 5A:
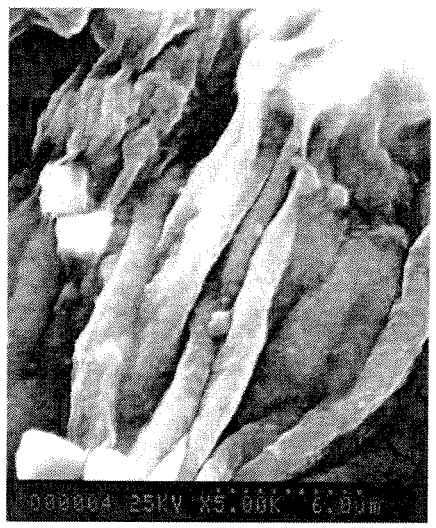
FIG. 5a is a SEM micrograph of single wall nanotube paper before radiation.
Figure 5B:
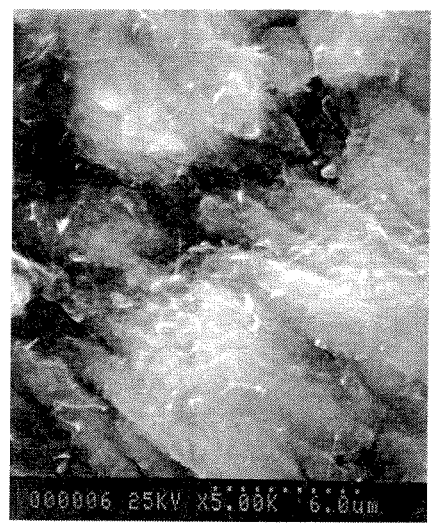
FIG. 5b is a SEM micrograph of single wall nanotube paper after 5.9 Mrad of gamma radiation.

Referring now to FIGS. 5a and 5b, the morphology of neat nanotube paper and composite coatings was characterized with scanning electron microscope (SEM) before and after radiation. These figures indicate that radiation alters the structure of the nanotubes. The SWNTs show a more smoothed out and dense structure after radiation.

Figure 6A:
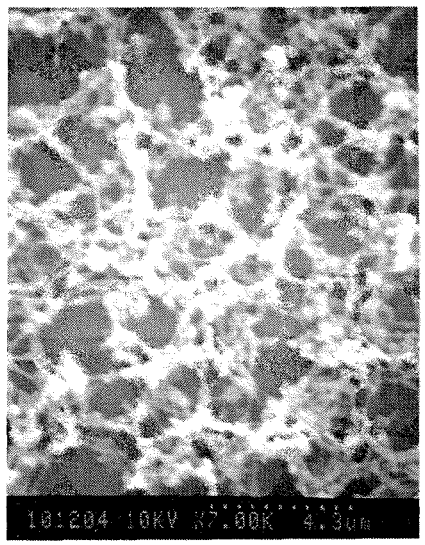
FIG. 6a is a SEM micrograph of spun coat films of 1% SWNT in PMMA before radiation.
Figure 6B:
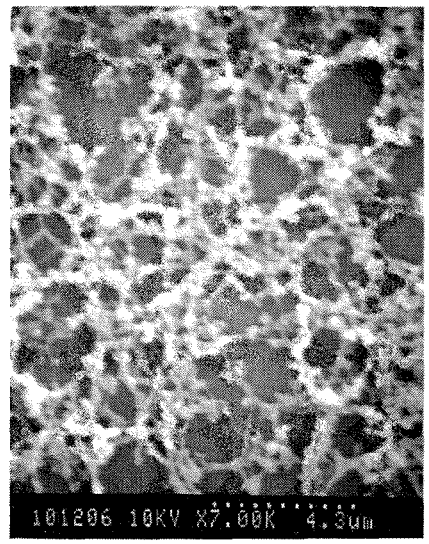
FIG. 6b is a SEM micrograph of spun coat films of 1% SWNT in PMMA after 5.9 Mrad of gamma radiation.

Referring now to FIGS. 6a and 6b, the morphology of spun coat film of 1% SWNT in PMMA before and after radiation is demonstrated. The effect of radiation on morphology is less pronounced in the composites than in the neat nanotube samples. Irradiated nanotube composites appear less densely agglomerated and more intersecting.

Table 4 lists the VICKERS hardness number for samples before and after exposure to 5.9 Mrads. The addition of 0.26% wt SWNTs increases the VICKERS hardness number from 19.3 to 21.1 in non-irradiated samples. After irradiation, the hardness number of the neat PMMA decreases to 17.6. However, exposure to gamma radiation hardly affects the hardness value of the composite. The microhardness measurements confirm both the DSC and DMA data that the composite has an improved radiation resistance.

TABLE 4

VICKERS hardness numbers from LEICA VMHT MOT

| Sample | VICKERS Hardness Number |
|---|---|
| PMMA | 19.3 ± 0.09 |
| PMMA, 5.9 Mrad | 17.6 ± 0.14 |
| PMMA/SWNT | 21.7 ± 0.17 |
| PMMA/SWNT, 5.9 Mrad | 21.1 ± 0.14 |

This is the first record of ionizing radiation effects on carbon nanotube composites. PMMA/SWNT composites are fabricated and exposed to gamma radiation. A concentration of only 0.26% carbon nanotubes increases the glass transition temperature and modulus of the matrix; these effects survive exposure to ionizing radiation. Carbon nanotubes increase the dielectric permitivity and ionic conductance of the composites. Dielectric properties are more labile to radiation effects than mechanical properties. These results prove that nanotechnology is useful for manufacturing radiation resistant materials.

Inasmuch as the preceding disclosure presents the best mode devised by the inventor for practicing the invention and is intended to make one skilled in the pertinent art to carry it out, it is apparent that methods incorporating modifications and variations will be obvious to those skilled in the art. As such, it should not be construed to be limited thereby, but should include such aforementioned obvious variations and be limited only by the spirit and purview of this application.

REFERENCES

1. S. Iijima, *Nature*, 354, 56 (1991).
2. Z. Jin, X. Sun, G. Xu, S. H. Goh and W. Ji, *Chem. Phys. Lettrs.*, 318, 505 (2000).
3. C. A. Grimes, C. Mingle, D. Kouzoudis, S. Fang and P. C. Eklund, *Chem. Phys. Lettrs.*, 319, 460 (2000).
4. A. Star, J. Frasser Stoddart, D. Steuerman, M. Diehl, A. Boukai, E. W. Wong, X. Yang, S-W. Chung, H. Choi and J. R. Heath, *Agnew Chem. Int. Ed.*, 9, 40 (2001).
5. L. S. Shadler, S. C. Giannaris and P. M. Ajayan, *Apply. Phys. Lettrs.*, 73, No. 26, 3842 (1998).
6. D. Qian, E. C. Dickey, R. Andrews and T. Rantell, *Apply. Phys. Lettrs.*, 76, No. 20, 2868 (2000).
7. C. Bower, R. Rosen, L. Jin and O. Zhou, *Apply. Phys. Lettrs.*, 74, No. 22, 3317 (1999).
8. L. Jin, C. Bower and O. Zhou, *Apply. Phys. Lettrs.*, 73, No. 9, 1197 (1998).
9. O. Lourie and H. D. Wagner, *Apply. Phys. Lettrs.*, 73, No. 24, 3527 (1998).
10. Z. Jia, Z. Wang, C. Xu, J. Liang, B. Wei, B. Wu and D. Wu, *Mater. Sci. and Eng.*, A271, 395 (1999).
11. F. Banhart, *Nano Lettrs.*, 1, No 6, 329 (2001).
12. A. V. Krasheninnikov, K. Nordlund, M. Sirvio, E. Salonen and J. Keinonen, *Phys. Rev.*, 63, 245405 (2001).
13. K. H. Kiang, W. A. Goddard III, R. Beyers and D. S. Bethune, *J. Phys. Chem.*, 100, 3749 (1996).
14. B. McCarthy, J. N. Coleman, S. A. Curran, A. B. Dalton, A. p. Davey, Z. Konya, A. Fonseca, J. B. Nagy and W. J. Blau, *J. Mater. Sci. Lettrs.*, 19, 2239 (2000).
15. G. L. Hwang and K. C. Hwang, *Nano Letters*, 8, 435 (2001).
16. A. Koshio, M. Yudasaka, M. Zhang and S. Iijima, *Nano Lettrs*, 0, No 0, est. 2.7 (2001).
17. S. Niyogi, H. Hu, M. A. Hamon, P. Bhowmik, B. Zhao, S. M. Rozenzhak, J. Chen, M. E. Itkis, M. S. Meier and R. C. Haddon, *J. Amer. Chem. Soc.*, 123, 733 (2001).
18. M. A. Hamon, J. Chen, H. Hu, Y. Chen, M. E. Itkis, A. M. Rao, P. C. Eklund and R. C. Haddon, *Adv. Mater.*, 11, No. 10, 834 (1999).
19. Y. Sun, S. R. Wilson, and D. I. Schuster, *J. Amer. Chem. Soc.*, 123, 5348 (2001).
20. B. C. Satishkumar, A. Govindaraj, J. Mofokeng, G. N. Subbanna, and C. N. R. Rao, *J, Phys. B. At. Mol. Opt. Phys*, 29, 4925 (1996).
21. E. Collins, J. Bares, F. W. Billmeyer. *Experiments in Polymer Chemistry*, (Wiley, 1973).
22. W. C. Oliver and G. M. Pharr, *J. Mater. Res.* 7, 1564 (1992).
23. R. G. Garrett, D. Hill, T. Le, K. Milne, J. O'Donnell, S. Perera, and P. Pomery, "Temperature Dependence of the Radiation Chemistry of Polymers," *Radiation Effects in Polymers*, eds. R. L. Clough and S. Shalaby, ACS Symposium Series 475 (ACS 1991) 150.
24. J. Guillot, *Polymer Photophysics and Photochemistry*, (Cambridge University Press 1985) 361.
25. R. L. Clough, K. T. Gillen and M. Dole, *Irradiation Effects on Polymers*, eds. D. W. Cleggand A. A. Collyer, (Elsevier Applied Science, 1991) 117.
26. H. Gao, J. P. Harmon, *Thermochimica Acta*, 284, 85, (1996)
27. R. Rao, *J. Chem. Phys.* 9, 682, (1941).
28. D. W. Van Krevelan and P. J. Hoftyzer, *Properties of Polymers* (Elsevier, 1970)
29. P. R. H. Bertolucci and J. P. Harmon, "Dipole-Dipole Interactions in Controlled Refractive Index Polymers," *Photonic and Optoelectronic Polymers*, S. A. Jenekhe and K. J. Wynne, Eds. *ACS Symposium Series*, 672, 79 (1997).
30. P. R. Higgenbotham-Bertolucci, H. Gao and J. P. Harmon, *Polymer Engineering and Science*, 41, 873, (2001).
31. S. K. Ernran, Y. Liu, G. R. Newkome, J. P. Harmon, *Journal of Polymer Science, Part B: Polymer Physics*, 39, 1381, (2001).
32. M. C. Calves and J. P. Harmon, "Miscibility Investigation of Fluorocarbon Copolymer and Methacrylate Copolymer Blends," *Optical Polymers Fibers and Waveguides*, eds. J. P. Harmon and G. K. Noren, ACS Symposium Series 795 (ACS 1999) 91.
33. S. K. Emran, G. R. Newkome, C. D. Weis, J. P. Harmon, *Journal of Polymer Science, Part B: Polymer Physics*, 37, 3025, (1999).

What is claimed is:
1. A method for providing a device with resistance to gamma radiation comprising:

a) selecting a type of device that is to be subjected to gamma radiation when in use;
b) obtaining the device comprising a single wall carbon nanotube/polymer composite at least at its surface, whereby the device is provided with resistance to gamma radiation; and
c) subjecting the device to an amount of gamma radiation, wherein obtaining the device comprising a single wall carbon nanotube/polymer composite at least at its surface comprises preparing the single wall carbon nanotube/polymer composite and providing it to at least the surface of the device, and
wherein preparing the single wall carbon nanotube/polymer composite comprises:
  dispersing single wall carbon nanotubes in a solvent to form a solution;
  adding a polymer to the solution to form a heterogeneous mixture;
  sonicating the heterogeneous mixture;
  precipitating out a single wall carbon nanotube/polymer mixture from the heterogeneous mixture;
  drying the single wall carbon nanotube/polymer mixture;
  folding and fracturing the dried single wall carbon nanotube/polymer mixture to form pieces of the single wall carbon nanotube/polymer mixture; and
  stacking and hot-pressing the single wall carbon nanotube/polymer mixture pieces to produce the single wall carbon nanotube/polymer composite.

2. The method according to claim 1, wherein the polymer is poly(methyl)methacrylate.

3. The method according to claim 1, wherein the device is molded of the single wall carbon nanotube/polymer composite.

4. The method according to claim 1, wherein the device is coated with the single wall carbon nanotube/polymer composite.

5. The method according to claim 1, wherein the device is a biomedical plastic or a scintillator.

6. The method according to claim 1, wherein obtaining the device comprises obtaining the device with the composite such that the composite is capable of having a decrease in a storage modulus, at about 10 Hz and about 75° C., of no more than 6% after being subjected to at least 5 Mrad (mega Radiation Absorbed Dose) of gamma radiation.

7. The method according to claim 1, wherein obtaining the device comprises obtaining the device with the composite such that the composite is capable of having a decrease in a glass transition temperature of no more than 1% after being subjected to at least 5 Mrad of gamma radiation.

8. The method according to claim 1, wherein obtaining the device comprises obtaining the device with the composite such that the composite is capable of having a decrease in a VICKERS hardness number of no more than 5% after being subjected to at least 5 Mrad of gamma radiation.

9. The method according to claim 1, wherein obtaining the device comprises obtaining the device with the composite such that the composite is capable of having a decrease in a storage modulus, at about 10 Hz and about 75° C., of no more than 6% after being subjected to at least 5 Mrad of gamma radiation; and wherein obtaining the device comprises obtaining the device with the composite such that the composite is capable of having a decrease in a glass transition temperature of no more than 1% after being subjected to at least 5 Mrad of gamma radiation; and wherein obtaining the device comprises obtaining the device with the composite such that the composite is capable of having a decrease in a VICKERS hardness number of no more than 5% after being subjected to at least 5 Mrad of gamma radiation.

10. The method according to claim 1, wherein the device is subjected to 3.86 Mrad of gamma radiation.

11. The method according to claim 10, wherein obtaining the device comprises obtaining the device with the composite at least at its surface, whereby the device is provided with resistance to at least 5 Mrad of gamma radiation.

12. The method according to claim 10, wherein obtaining the device comprises obtaining the device with the composite at least at its surface, whereby the device is provided with resistance to 5.9 Mrad of gamma radiation.

13. The method according to claim 1, wherein the device is subjected to 5.9 Mrad of gamma radiation.

14. The method according to claim 13, wherein obtaining the device comprises obtaining the device with the composite at least at its surface, whereby the device is provided with resistance to at least 5 Mrad of gamma radiation.

15. The method according to claim 13, wherein obtaining the device comprises obtaining the device with the composite at least at its surface, whereby the device is provided with resistance to 5.9 Mrad of gamma radiation.

16. The method according to claim 1, wherein obtaining the device comprises obtaining the device with the composite at least at its surface, whereby the device is provided with resistance to at least 5 Mrad of gamma radiation.

17. The method according to claim 1, wherein obtaining the device comprises obtaining the device with the composite at least at its surface, whereby the device is provided with resistance to 5.9 Mrad of gamma radiation.

18. The method according to claim 1, wherein subjecting the device to an amount of gamma radiation on the order of a Mrad comprises subjecting the device to gamma radiation in a space environment.

* * * * *

UNITED STATES PATENT AND TRADEMARK OFFICE
CERTIFICATE OF CORRECTION

| | |
|---|---|
| PATENT NO. | : 8,815,144 B2 |
| APPLICATION NO. | : 12/716659 |
| DATED | : August 26, 2014 |
| INVENTOR(S) | : Julie P. Harmon et al. |

It is certified that error appears in the above-identified patent and that said Letters Patent is hereby corrected as shown below:

In The Specification

Column 1,
Line 37, "Shadier" should read --Shadler--.
Line 46, "TC bonds" should read --$\pi$ bonds--.

Column 3,
Line 33, "My was" should read --$M_v$ was--.

Column 4,
Line 7, "inflection inflection of" should read --inflection of--.
Lines 50-51, "Low Low molecular" should read --Low molecular--.

Column 5,
Line 46, "Krevel an," should read --Krevelan,--.

Column 8,
Line 43, "(1996)" should read --(1996).--.
Line 53, "S. K. Ernran," should read --S. K. Emran,--.

Column 10,
Lines 49-50, "radiation on the order of a Mrad comprises" should read --radiation comprises--.

Signed and Sealed this
Twenty-eighth Day of April, 2015

Michelle K. Lee
*Director of the United States Patent and Trademark Office*